United States Patent [19]

Cutler

[11] Patent Number: 4,675,225
[45] Date of Patent: Jun. 23, 1987

[54] THERMAL INSULATING BLANKET

[75] Inventor: William P. Cutler, Flanders, N.J.

[73] Assignee: J.M.J. Technologies Inc., Flanders, N.J.

[21] Appl. No.: 720,392

[22] Filed: Apr. 5, 1985

[51] Int. Cl.[4] .......................... B32B 3/10; B32B 1/06
[52] U.S. Cl. ......................................... 428/74; 52/3;
428/76; 428/131; 428/137; 428/920
[58] Field of Search ................... 428/74, 76, 131, 137, 428/920; 52/3, 63

[56] References Cited

U.S. PATENT DOCUMENTS

| 2,779,066 | 1/1957 | Gaugler et al. | 428/76 |
| 3,004,877 | 10/1961 | Simms et al. | 428/69 |
| 3,162,566 | 12/1964 | Katz | 428/74 |
| 4,172,915 | 10/1979 | Sheptak et al. | 428/75 |
| 4,210,070 | 7/1980 | Totum et al. | 428/193 |
| 4,420,521 | 12/1983 | Carr | 428/131 |
| 4,444,821 | 4/1984 | Young et al. | 428/76 |
| 4,486,482 | 12/1984 | Kobayashi et al. | 428/76 |
| 4,590,714 | 5/1986 | Walker | 428/74 |

FOREIGN PATENT DOCUMENTS 3347619 7/1984 Fed. Rep. of Germany ...... 428/920

Primary Examiner—Paul J. Thibodeau
Attorney, Agent, or Firm—James M. Trygg

[57] ABSTRACT

A thermal insulating blanket is disclosed for providing an insulating barrier across doorways, stairways, and other openings between a heated area and an unheated area. The thermal insulating blanket includes an inner layer of flexible and compressible insulating material and an outer layer of flexible material. Means is provided for venting the air contained within the thermal insulating blanket to the ambient atmosphere when the blanket is compressed and restrained for compact storage. A resiliency inherent in the structure assures that the blanket returns to its pre-compressed state upon release of the restraints.

6 Claims, 12 Drawing Figures

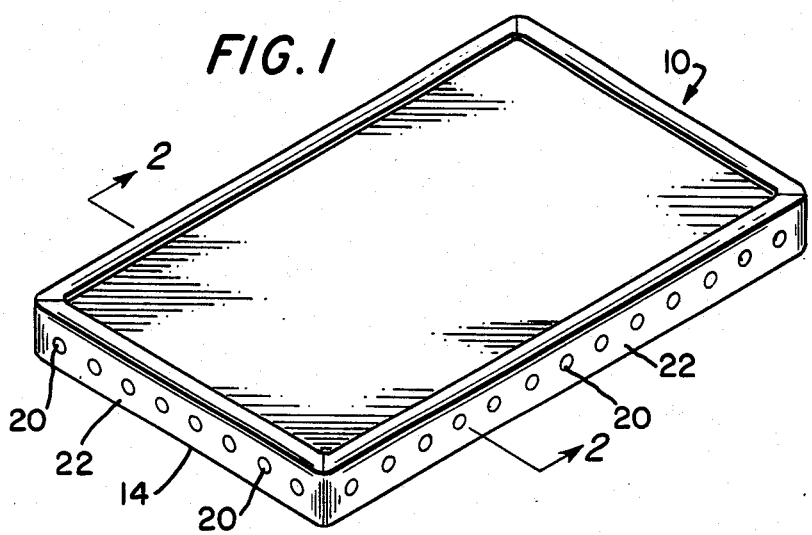
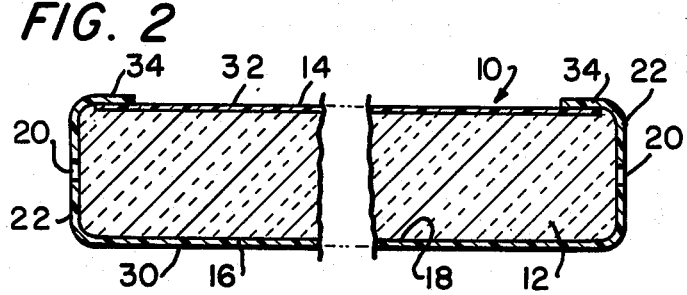
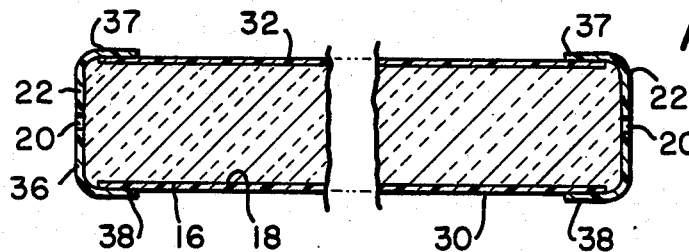
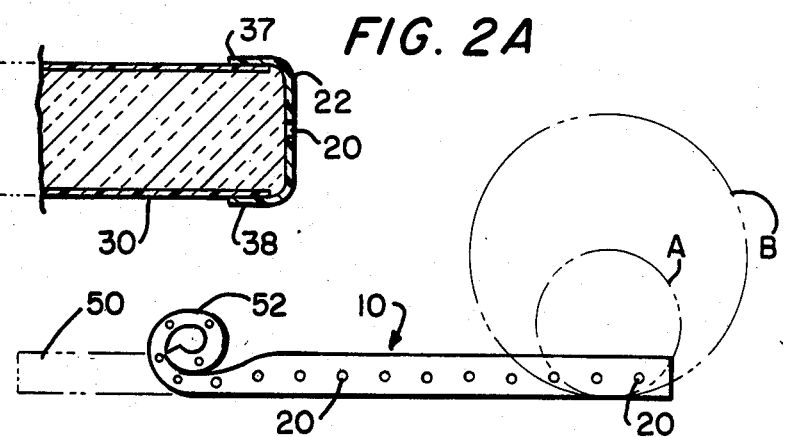
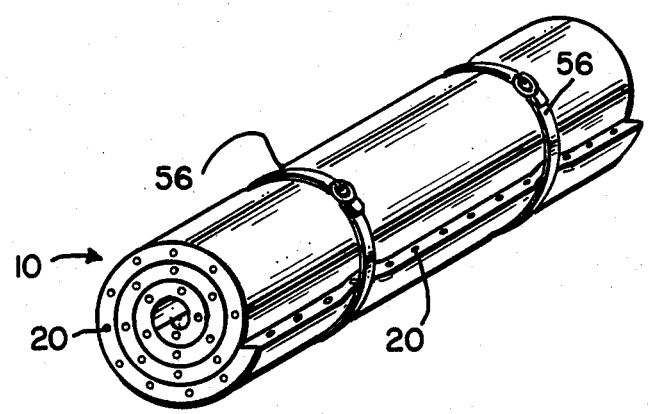

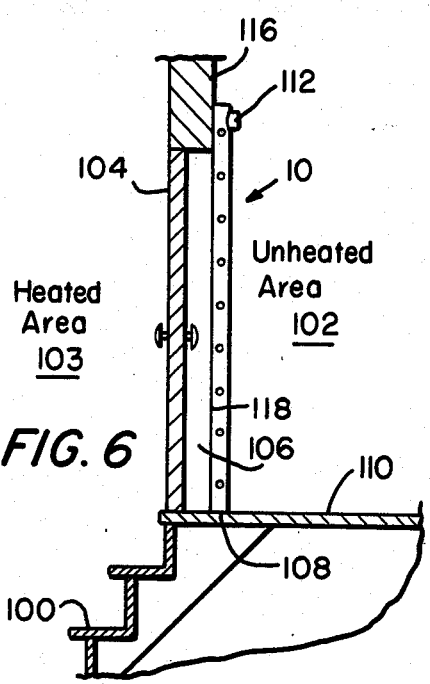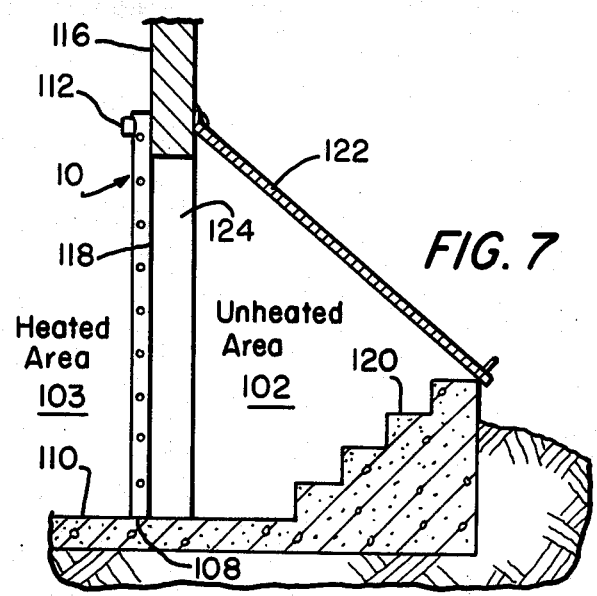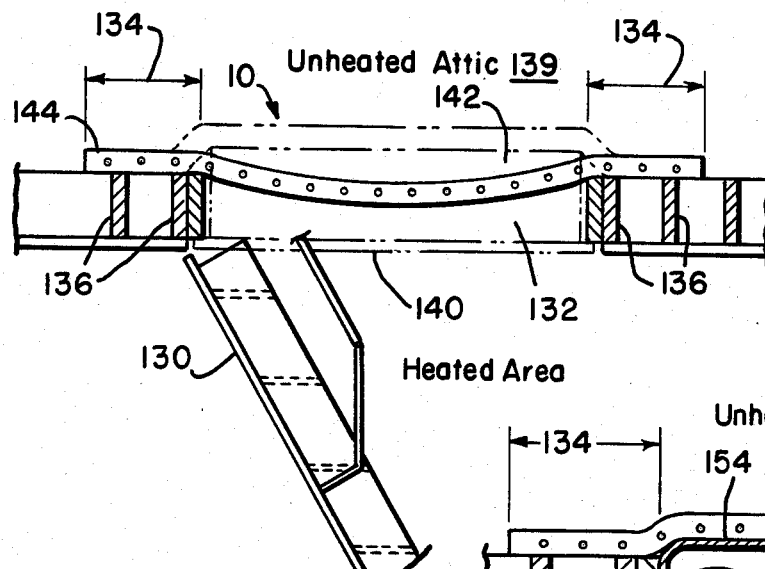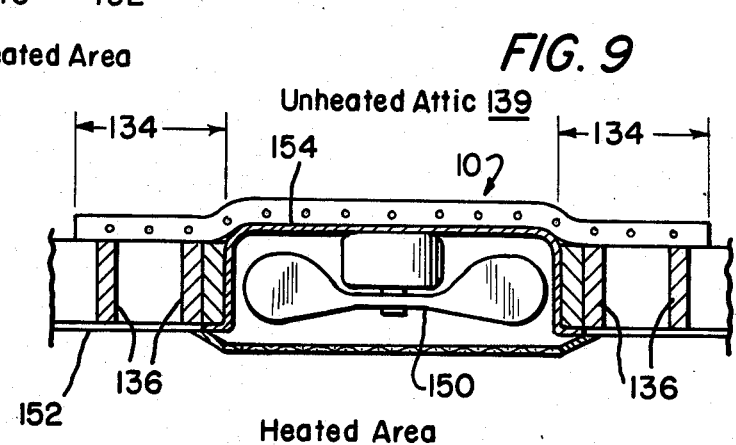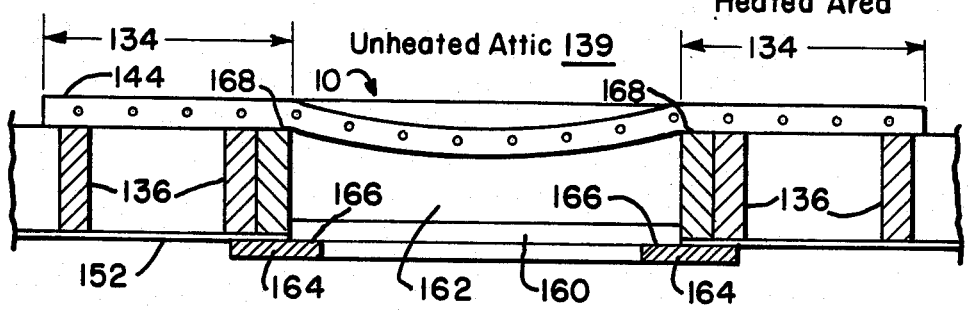

THERMAL INSULATING BLANKET

This invention relates to thermal insulating blankets and heat barriers of the type used to cover an opening or accessway in a residential or commercial building to prevent loss of heat therethrough. In particular, this invention relates to such insulating blankets that are reuseable and that may be conveniently stored while not in use.

BACKGROUND OF THE INVENTION

Thermal insulating structures having a relatively thin outer membrane and an insulating material sealed inside of the membrane are commonly used to insulate household appliances such as refrigerators, freezers, water-heaters, and similar apparatus. Such insulating structures are also utilized in the walls of truck bodies and other vehicles, residential and commercial buildings, and a variety of specialized applications such as around heat producing apparatus, e.g., recessed light fixtures. See U.S. Pat. No. 3,004,877 which issued Oct. 17, 1961 to Simms et al., U.S. Pat. No. 1,942,162 which issued Jan. 2, 1934 to Campbell, and U.S. Pat. No. 4,210,070 which issued July 1, 1980 to Tatum et al. for examples of this type of thermal insulating structure. The outer sheath, or covering, of these insulating structures is typically sealed to the ambient atmosphere to minimize absorption of moisture by the insulating material contained therein and to prevent exchange of cool ambient air with warmer air trapped within the outer sheath. An enhancement of this type of structure is the inclusion of a charge of gas having a low coefficient of thermal conductivity within the sealed membrane instead of air. For an example of this type of structure see U.S. Pat. No. 4,172,915 which issued Oct. 30, 1979 to Shoptak et al. All of the above referenced insulating structures are intended for permanent installation in specific applications. Such insulating structures do not lend themselves to use in applications where the need is seasonal or intermittant and where the insulating structure must be conveniently stored between uses. The primary reason for this is their inherent inability to be adequately compressed for storage without adversely affecting their functional performance subsequent to storage.

The common blanket or comforter used as domestic bedding is of seasonal use and is typically folded for convenient storage. However, such blankets or comforters are substantially inferior in overall thermal insulating qualities to the thermal structures used in permanent installations described above and therefore would not be suitable for insulating accessways, door openings, and the like.

What is needed is a thermal structure having a high degree of thermal insulating ability combined with the ability to be compressed into a relatively small package for convenient storage and subsequently reused without any substantial loss of utility.

SUMMARY OF THE INVENTION

According to the present invention there is shown a thermal insulating blanket comprising an inner layer of flexible and compressible insulating material completely surrounded by an outer layer of flexible material. The inner layer has a free form state wherein an amount of contained air permeates the inner layer and a compressed state wherein a substantial amount of the contained air is excluded therefrom. Vent means is included for communicating the contained air with the ambient atmosphere and is arranged so that upon compression of the insulating blanket a substantial amount of the contained air flows to the ambient atmosphere. Upon release of the compression, air flows from the ambient atmosphere thereby replenishing the contained air.

BRIEF DESCRIPTION OF THE DRAWINGS

FIG. 1 is an orthogonal view of a thermal insulating blanket embodying the teachings of the present invention;

FIG. 2 is a sectional view taken along the lines 2—2 of FIG. 1,

FIG. 2A is a sectional view similar to that of FIG. 2 showing an alternative side structure;

FIG. 3 is a partial sectional view similar to that of FIG. 2 showing an alternative side structure;

FIG. 3A is a partial sectional view similar to that of FIG. 3 showing an alternative side structure;

FIG. 4 is a side elevation view of the thermal insulating blanket of FIG. 1 shown in a partially compressed state;

FIG. 5 is an isometric view of the thermal insulating blanket of FIG. 4 shown in a compressed state ready for storage;

FIG. 6 is a partial sectional view of a typical stairway and door arrangement leading to an unheated area of a building showing the thermal insulating blanket of FIG. 1;

FIG. 7 is a partial sectional view of a typical outside entranceway to a below grade level of a building showing the thermal insulating blanket of FIG. 1;

FIG. 8 is a view similar to that of FIG. 6 showing a pull-down folding stairway arrangement;

FIG. 9 is a partial sectional view of a typical ceiling exhaust fan adjacent an unheated area of a building showing the thermal insulating blanket of FIG. 1; and FIG. 10 is a partial sectional view of a typical ceiling access way to an attic showing the thermal insulating blanket of FIG. 1.

DESCRIPTION OF THE PREFERRED EMBODIMENT

There is shown in FIGS. 1, 2, 2A, 3, and 3A, a compressible thermal insulating blanket 10 having an inner layer 12 of a flexible and compressible insulating material and an outer layer 14 of a flexible material. The inner layer 12 may be composed of any suitable commercially available insulating material such as fiberglass, rockwool, or glasswool. The important requirements are that the inner layer 12 have a low coefficient of thermal conductivity and be flexible and resiliently compressible so that it may be substantially compressed for long periods of time without affecting its ability to return to its pre-compressed state when released.

The outer layer 14 is arranged to completely envelop the inner layer on all sides and thereby retain within the interior any glass fibers or particles that may separate from the inner layer. This is a very important advantage of the present invention in that potentially harmful particles or fibers will not be permitted to enter the living space. The outer layer 14 is constructed from a relatively thin sheet of vinyl, polyurethane, plastic, or similar type of material. The thickness of the layer 14 is approximately 0.002 to 0.015 inches depending on the desired durability of the finished article.

One surface 16 of the inner layer 12 is attached to an inside adjacent surface 18 of the outer layer 14. This attachment may be effected by adhesive or any suitable bonding means. The entire surface 16 need not be attached. The only requirement is that there be attachment over a sufficient area so that the inner layer 12 will not shift with respect to the outer layer 14.

A series of vent holes 20 are formed through and spaced along portions of the edges 22 of the outer layer 14 as shown in FIG. 1. The vent holes 20 are of about one quarter inch in diameter, and spaced about eight inches apart. The diameter and spacing of the holes 20, however, are not critical to the practice of the present invention provided that the vent holes 20 permit sufficient quantities of air to pass through the holes during compression and expansion of the blanket 10 as described below.

The outer layer 14 may be constructed in any of several ways as shown in FIGS. 2, 2A, 3, and 3A. FIG. 2 shows a two piece structure having a bottom portion 30 and a top portion 32. The bottom portion 30 is folded upwardly on four sides thereby forming the edges 22 and is folded over the top so that a flap 34 overlays the top portion 32 by a small amount. The corners where pairs of the edges 22 meet may be formed into a miter or pleat to minimize build-up of material at these points. The flap 34 may be attached to the overlaid edges of the top portion 32 by pressure sensitive tape, adhesive, or any suitable bonding or fusing means.

A second embodiment of the present invention is depicted in FIG. 2A which shows a structure that is similar to that of FIG. 2 except that a separate strip 36 having top and bottom flaps 37 and 38 respectively is utilized instead of folding the bottom portion 30 upwardly. In this embodiment of the invention the flaps 37 and 38 are attached to the top and bottom portions 32 and 30 respectively in a manner similar to that described for the flap 34.

A third embodiment of the present invention is shown in FIG. 3 wherein the top and bottom portions 32 and 30 respectively form mutually adjacent flaps or flanges 40 which are attached together in a manner similar to that described for the flap 34. A variation of this structure is shown in FIG. 3A where a flap of the top portion 32 is attached to an edge 42 that defines the periphery of the bottom portion 30. As with the structures shown in FIGS. 1, 2, and 2A, a series of vent holes 20 are formed through and suitably spaced along the edges 22 of the embodiments shown in FIGS. 3 and 3A.

One of the more important advantages of the thermal insulating blanket 10 is that it may be substantially compressed into a compact unit for storage. When preparing the thermal insulating blanket 10 for storage it is first positioned on a flat surface such as a table top or floor as shown in FIG. 4. One end 50 is then manually compressed and folded over to form the beginning of a tight roll 52. The roll 52 is held tightly and caused to slowly roll to the right, as viewed in FIG. 4, thereby expelling through the vent holes 20 a substantial quantity of the air contained within the interior of both the inner layer 12 and the outer layer 14. This tight rolling of the roll 52 continues until the blanket 10 is completely and compactly rolled into a cylinder, the outer diameter of which is schematically represented by the circle A in FIG. 4. Two or more ropes, belts, or suitable ties 56 are then tightly secured around the compact cylinder, as shown in FIG. 5, to maintain the thermal insulating blanket 10 in a compressed and compact state. An alternative to the individual ropes or belts is a single long rope or belt, not shown, which is wrapped tightly around the compact cylinder in a helical pattern and secured in place. In either case, the thermal insulating blanket 10, when in this compressed and compact state, may be placed into a storage bag, not shown, for convenience in transporting and handling. The thermal insulating blanket 10, when in this compact state occupies a volume of about one-fourth of the volume occupied when in its uncompressed free state. That is, the diameter of the compactly rolled cylinder, schematically represented by the circle A in FIG. 4, is one-half the diameter of a loosely rolled cylinder which is schematically represented by the circle B in FIG. 4. This represents the significant savings of about three-quarters of the space required for storing an insulating blanket that cannot be compressed. When it is desired to utilize the blanket 10 after it has been stored in its compressed state for a period of time, it is only necessary to release the ties 56 and unroll the blanket. As the natural resiliency inherent in the inner layer 12 causes the inner layer to expand, air from the room, that is ambient air, will pass through the vent holes 20 and into the interior of the inner layer. This will continue until the inner layer 12 has expanded to substantially its pre-compressed state.

Another important advantage of the thermal insulating blanket 10 is that it may be completely removed from the attic access openings, stairways, and ceiling openings during the warmer months of the year. This permits warm air that would normally accumulate near the ceiling to pass into the attic through any small openings that would normally be present between the stairway structure or fan housing and the frame of the opening. This significantly enhances the efficiency of airconditioning systems when operating in a room having such a ceiling opening.

Another important advantage of the thermal insulating blanket 10 is that potentially harmful or irritating particles or fibers which may separate from the fiberglass inner layer 12 are substantially contained within the interior of the blanket 10. This greatly reduces the risk of such particles or fibers entering the living space during use of the blanket 10 as set forth herein.

FIGS. 6 through 8 depict several applications in which use of the thermal blanket 10 is particularly advantagous. FIG. 6 shows a partial cross sectional view of a stairway 100 leading to an unheated room or attic area 102. A door 104 is shown separating the heated and unheatead areas. The thermal insulating blanket 10 is hung across the door opening 106, as shown in FIG. 6, so that the lower edge 108 of the blanket 10 is in light contact with the floor 110. A rail 112 having a portion of the blanket 10 sandwiched between it and the wall 116 is fastened to the wall with nails, screws or other suitable fasteners. By this means the blanket 10 is fastened to the wall 116 across the top of the door opening only, leaving the sides and lower porton of the blanket hanging freely but in contact with the sides 118 of the door frame so that the door opening is thermally isolated from the unheated area 102. In order for a person to pass through the door opening, the door is opened in the normal manner and the thermal insulating blanket 10 merely pushed aside. It will be understood by those skilled in the art that the door 104 and the blanket 10 may be arranged in positions opposite to those shown in FIG. 6 and that such an arrangement is considered equivalent to that shown. Further, in certain cases, the use of the blanket 10 obviates the need for the door 104.

A partial cross sectional view of a stairway 120 leading from an unheated area 102 to a heated area 103 that is below grade is shown in FIG. 7. This is a typical structure for an outside entranceway to a basement wherein a hinged door 122, or in some cases a pair of mating doors, is arranged to cover the stairway 120. Such doors are highly ineffective in preventing infiltration of cold air into the heated area 103. In accordance with the present invention a thermal insulating blanket 10 is hung across a passage opening 124 formed in the wall 116 in a manner similar to that for the door opening 106 of FIG. 6. A rail 112 is used to fasten the blanket 10 to the wall 116 above the passage opening 124 so that the blanket hangs freely and covers the passage opening as shown in FIG. 7. The blanket 10 may be pushed aside when one desires to pass through.

A partial cross sectional view of a typical folding or "pull down" stairway 130 to an attic 139 is shown in FIG. 8. Folding stairways of this type are installed in an opening formed in the ceiling specifically for this purpose. As will be appreciated by those skilled in the art, such folding stairways account for substantial heat loss into the attic area. This is due to many reasons. The ceiling surface area occupied by the folding stairway is relatively large, typically about twelve square feet or more. Heat transfer through this large uninsulated surface area can be substantial. Further, the folding stairway is arranged so that a specific amount of clearance space exists between the surface of the folding stairway and the sides of the opening. This clearance space is needed to assure proper operaton of the mechanism of the stairway, however, the space permits the flow therethrough of warm air from the heated space into the attic.

Attempts to seal this clearance space and provide other insulation to reduce the loss of heat into the attic have heretofore met with little success. Some of the reasons for this lack of success appear to be inherent in the structure of the folding stairway. That is, a folding stairway necessarily includes a mechanical mechanism which is actuated when raising and lowering the stairs. There is usually a counterbalance mechanism and a hand rail that must retract or extend. The steps themselves are usually arranged in two or three hinged segments which interfold prior to or during retraction of the stairway up into the ceiling. All of these moving parts which must necessarily operate when the stairway is being extended or retracted make it difficult, if not impossible, to effectively place insulation within the stairway structure so that heat transfer from the heated room to the attic is within acceptable limts. These problems, however, are obviated by the present invention wherein the thermal insulating blanket 10 is simply draped across the stairway opening 132 as shown. The blanket 10 is substantially larger than the opening 132 permitting an overlap area 134 of approximately twenty-four inches. This overlap is sufficient so that the blanket 10 should, in most cases, contact at least two joists 136 on two sides of the opening 132.

When the folding stairway 130 is in its closed and fully retracted position, as shown by the phantom lines 140 in FIG. 8, it may project somewhat above the top of the joists 136. This will cause the thermal insulating blanket 10 to be displaced upwardly a small amount as shown by the phantom lines 142 in FIG. 8. This small upward displacement, however, will have no adverse affect on the functional performance of the blanket 10 because of the substantial overlap areas 134. When the stairway 130 is opened to its fully extended position, as shown in FIG. 8, the thermal insulating blanket 10 will sag somewhat within the opening 132. The blanket 10, being supported on four sides by the frame around the opening 132, has sufficient rigidity so that it remains in place without falling through the opening. When one climbs the stairway 130 to enter the attic 139, one end 144 of the blanket 10 is simply folded back to permit passage. Since the thermal insulating blanket 10 is encased in an outer layer 14, potentially harmful or irritating particles or fibers which may separate from the fiberglass inner layer 12 are substantially contained within the interior of the blanket 10.

Another application of the thermal insulating blanket 10 is shown in FIG. 9. There, an attic fan 150 is disposed in a ceiling 152 in a manner that is well known in the art. The area above the fan 150 is typically an unheated attic 139. As with the folding stairway 130, the fan housing 154 may project above the joists 136 an amount as shown in FIG. 9, causing the thermal insulating blanket 10 to be displaced upwardly by that amount directly over the fan. There are, however, substantial overlap areas 134, of about twenty-four inches, helping to assure that the blanket 10 will contact at least two joists on two sides. As described above in the folding stairway application, potentially harmful particles or fibers which may separate from the fiberglass inner layer 12 are contained within the interior of the blanket 10 thereby reducing the risk of such particles or fibers falling through the fan housing and into the living space below.

Another application of the thermal insulating blanket 10, similar to that of the attic fan 150 described above, is insulating the typical ceiling access way to an unheated attic 139. Such an application is depicted in FIG. 10 wherein a hatch 160 is disposed in an opening 162 in a ceiling 152 in a manner that is well known in the art. The hatch 160 is usually a rectangularly shaped piece of wood that is retained within the opening by the molding pieces 164. The molding pieces 164 are customarily fastened to the ceiling 152 so that they slightly overlap the opening 162 on all sides thereby providing a shoulder 166 upon which the hatch 160 may rest.

The thermal insulating blanket 10, as shown in FIG. 10, is draped across the opening 162 in a manner similar to that of the stairway opening 132 of FIG. 8. There are substantial overlap areas 134, of about twenty-four inches, helping to assure that the blanket 10 will, in most cases, contact at least two joists 136 on two sides. As shown in FIG. 10, the blanket 10 will sag a small amount within the opening 162, however, the blanket 10 is supported on four sides by the frame of the opening 162. When one wishes to enter the attic 139 through the opening 162, the hatch 160 is simply pushed upwardly, displacing the blanket 10 upwardly a small amount until the hatch clears the top 168 of the frame. The hatch 160 is then laterally displaced so that it completely clears the opening 162 and rests on top of the joists 136 in the usual manner that is well known in the art. As with the folding stairway application described above, one end 144 of the blanket 10 is simply folded back to permit passage.

It will be understood that one of the more important advantages of the present invention is the ability of the thermal insulating blanket 10 to be substantially compressed and arranged in a compact unit for storing without adversely affecting its ability to functionally perform at a later time. This is due to its unique structure wherein an inherent resiliency urges it into an expanded state for maximum thermal insulating attributes and vent means which permits conforming the blanket 10 into a compressed state for convenient storage.

The above described applications of the thermal insulating blanket 10 indicate its unique usefulness. Upon reading the present disclosure additional beneficial uses of the thermal insulating blanket 10 will become apparent to those skilled in the art and such uses are considered to be within the spirit and scope of the following claims.

I claim:

1. A reusable compressible thermal insulating blanket for covering an opening in a building comprising:
    (a) an inner layer of flexible and compressible insulating material having inherent resiliency and a free form state wherein an amount of contained air permeates said inner layer and a compressed state wherein a substantial amount of said contained air is excluded therefrom;
    (b) an outer layer of flexible material completely surrounding said inner layer; and
    (c) vent means for communicating said contained air with the ambient atmosphere and arranged so that upon compression of said insulating blanket a substantial amount of said contained air flows to the ambient atmosphere thereby forming a compact unit for storage and upon release of said compression, said inherent resiliency urges said inner layer into said free form state so that air flows from said ambient atmosphere replenishing said contained air,
    wherein said inner layer, when in said free form state, includes a pair of mututally opposed surfaces one of which is in substantial contact with a portion of said outer layer, and said vent means comprises a perforation through another portion of said outer layer.

2. The article set forth in claim 1 wherein said inner layer of insulating material is fiberglass.

3. The article set forth in claim 4 wherein said outer layer is plastic and said portion of said outer layer is an interior wall of said plastic sheath which is held in said substantial contact with said one of said pair of mutually opposed surfaces by adhesive.

4. The article set forth in claim 3 wherein said inner layer of insulating material is fiberglass.

5. The article set forth in claim 4 wherein said outer layer is vinyl and said portion of said outer layer is an interior wall of said vinyl sheath which is held in said substantial contact with said one of said pair of mutually opposed, surfaces by adhesive.

6. The article set forth in claim 5 wherein said inner layer of insulating material is fiberglass.

* * * * *